March 3, 1970   F. J. BAUR ET AL   3,498,798
PACKAGING OF CHIP-TYPE SNACK FOOD PRODUCTS
Filed July 29, 1966

INVENTORS
FREDRIC J. BAUR
HAROLD KENNETH HAWLEY
BY
ATTORNEYS

United States Patent Office 3,498,798
Patented Mar. 3, 1970

3,498,798
PACKAGING OF CHIP-TYPE SNACK
FOOD PRODUCTS
Fredric J. Baur, Cincinnati, and Harold Kenneth
Hawley, Springfield, Ohio, assignors to The Procter
& Gamble Company, Cincinnati, Ohio, a corporation of Ohio
Filed July 29, 1966, Ser. No. 568,878
Int. Cl. B65b 23/00
U.S. Cl. 99—171                        6 Claims

ABSTRACT OF THE DISCLOSURE

Chips of uniform size and shape are stacked one upon the other in closely fitting relationship to form a stacked array, and are then placed within a rigid tubular container formed from materials which are substantially impervious to the passage of oxygen and water vapor. The ends are applied to the container to seal the same.

---

The packaging of potato chips and other chip-type snack food products as generally practiced involves placing the chips into a bag in a random manner, the bag having been fashioned from one or more sheets of waxed paper or glassine. This type of package, while relatively inexpensive, provides little protection from handling and shipping loads imposed on the fragile chips and thus it is quite common to find a considerable number of broken chips within the bags. Furthermore, a bag-type package which has been randomly packed with potato chips, for example, can have a significant quantity of oxygen and water vapor packaged with the chips and can also fail to completely prevent the entry of additional oxygen and water vapor therethrough. The presence of oxygen and water vapor within the package is undesirable since the oxygen tends to react with the frying fat retained by the chips to cause the fat to become rancid and thereby impart an undesirable rancid odor and taste to the chips and the water vapor causes the chips to lose crispness and become stale in flavor. As a result of the use of this type of packaging, the normal shelf life of potato chips and other snack food products is relatively short, being on the order of two or three weeks because of the onset of oxidative rancidity and staling. After this period the chips are not in an acceptable condition and those not sold and consumed by that time are usually discarded.

In addition to the lack of product protection which results from the present packaging approach, the resulting package is rather bulky because of the low density attendant with the random arrangement of the chips packaged therein. An excessive amount of packaging material is therefore required, resulting in higher package cost because of the additional material used. Although such bags are the most prevalent form of package for snack food products such as potato chips, cans are also used, particularly for larger quantities of chips. The cans used, however, usually have slip-on metal covers and are not sealed to the extent necessary to prevent the entrance of oxygen and water vapor within the can. In addition, the low bulk density of the chips requires the use of a relatively large can for a relatively small amount of chips, thereby rendering the cost of such a package for potato chips prohibitively high.

Accordingly, it is an object of this invention to provide an improved method of packaging snack food products in chip form, the chips being arranged in a compact manner which requires less packaging material and thereby results in lower package cost and less usage of shelf space in both stores and in the home.

Another object of the invention is to provide a compact, protective package for snack food products which package will prevent breakage of the contents while in transit.

A further object of this invention is to provide a method and a package for packaging snack food products to minimize the quantity of oxygen and water vapor which is packed with the product and thereby increase the shelf life of the product by excluding excess oxygen and water vapor therefrom, thereby delaying the onset of oxidative rancidity and staling.

Briefly stated, in accordance with one aspect of the invention, a package for chip-type snack food products and a method of packaging the chips therein are provided. The chips used are of non-planar shape and are first formed into the desired curved shape in a uniform manner to permit the chips to be stacked one upon the other to form a grouped array and thereby minimize the void space therebetween. The chips are stacked one upon the other with corresponding surfaces similarly oriented and are then placed in a substantially rigid, tubular container which is adapted to enclose the stack of closely packed chips. After being inserted into the tubular container, the latter is sealed closed by securing one or more ends thereto. Both the tubular container and the ends are fabricated from materials which are impervious to oxygen and water vapor to prevent the entrance of additional atmospheric oxygen and water vapor into the interior of the package which would rancidify the frying fat retained by the chips and result in the chips becoming stale.

While the specification concludes with claims particularly pointing out and distinctly claiming the subject matter regarded as forming the present invention, it is believed the invention will be better understood from the following description taken in connection with the accompanying drawings in which:

Figure 1:
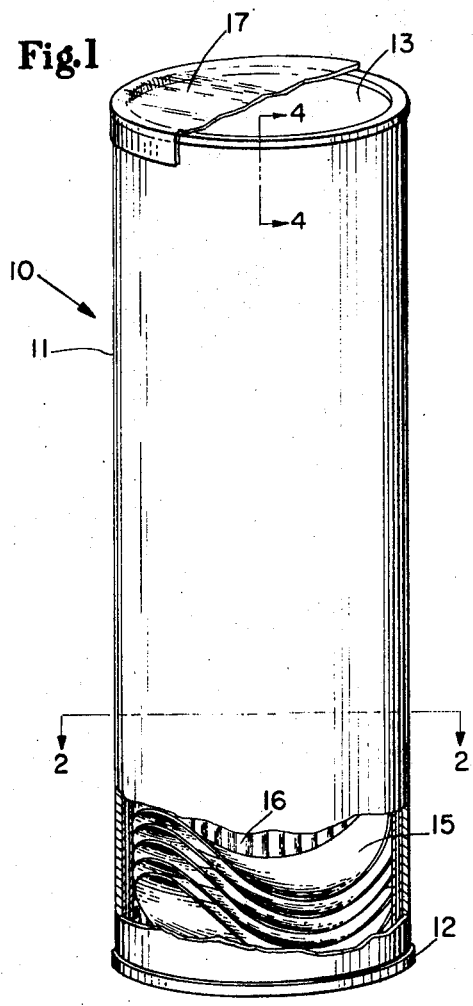
FIGURE 1 is an elevational view of a snack food package according to the present invention and is partially broken away to show both the arrangement of the contents within the container and the structure of the top of the container.
Figure 2:
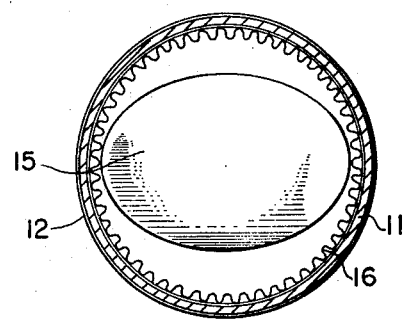
FIGURE 2 is a cross-sectional view taken along the line 2—2 of FIGURE 1.

Referring now to the drawings, and particularly to FIGURES 1 and 2, there is shown a package 10 having an upstanding, tubular sidewall 11 of cylindrical cross section which is closed at its ends by end closure members 12 and 13.

The tubular sidewall 11 can be constructed of any conventional materials but is preferably made from materials which are sufficiently rigid to withstand handling and shipping loads and substantially impervious to the passage of gases so that oxygen and water vapor are precluded from entering the package and causing rancidity of the frying fat retained by the chips and staling of the chips themselves. A metallic, tin plate structure is an example of one material which can be used for the sidewall. This material is commonly used in the manufacture of tin cans and comprises a thin sheet of steel coated on both sides with tin, as is well known in the art. A fibre sidewall is also suitable but it is preferred that this construction have a layer of metallic foil or the like included therein to provide a sufficient barrier to the passage of oxygen and water vapor therethrough. An example of a suitable fibre sidewall construction having the requisite strength and oxygen barrier properties is as follows (listed from the inside of the tubular sidewall toward the outside).

| Component: | Approximate basis weight (lb./3000 sq. ft.) |
| --- | --- |
| Polypropylene (0.001 inch) | 15 |
| Adhesive | 1 |
| Aluminum foil (0.00035 inch) | 14 |
| Polyethylene (0.0005 inch) | 8 |
| Kraft paper | 30 |
| Adhesive | 1 |
| Kraft board (0.012 inch) | 126 |
| Adhesive | 1 |
| Kraft board (0.012 inch) | 126 |
| | 322 |

In the foregoing construction the kraft paper and kraft board provide the rigidity to the structure and the aluminum foil provides the oxygen and water vapor barrier. The polyethylene is used to laminate the foil to the paper while the polypropylene is intended to provide an additional barrier in the event the foil should develop any pinholes and also to provide a resilient coating for the foil to protect it from surface scratches and the like. A label can be adhered to the outside of the sidewall and can be paper which has been printed to indicate the name and the character of the product therein packaged. Alternatively, a printed foil label can be used. The foil provides an additional barrier to the passage of oxygen and water vapor and results in an attractive, metallic appearance. Such a label can have the following construction.

| Component: | Approximate basis weight (lb./3000 sq. ft.) |
| --- | --- |
| Kraft paper | 30 |
| Adhesive | 1 |
| Aluminum foil (0.0030 inch) | 12 |
| Printing ink | 2 |
| Total | 45 |

Numerous other materials and combinations thereof having the desired oxygen barrier properties can be used for both the side wall construction and for the label, as will be apparent to those skilled in the art.

Figures 3, 4:
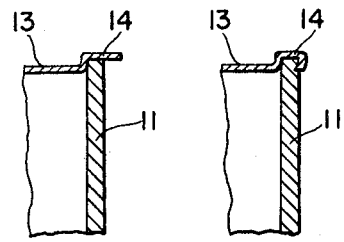
FIGURE 3 is a fragmentary cross-sectional view showing the top member of the package positioned on the side wall before being secured thereto.
FIGURE 4 is a fragmentary cross-sectional view taken along the line 4—4 of FIGURE 1 and showing the seal between the top member and the side wall of the package.

The package 10 has end closure members 12 and 13 secured thereto by crimping to provide a tight, hermetic seal to the package. FIGURES 3 and 4 illustrate the seal and show how the top and bottom members 12 and 13 are secured to a fibre sidewall 11 which may be a laminate of the character previously described. Although only top member 13 is shown, the seal and method shown and described are also applicable to bottom member 12. In FIGURE 3, top member 13 is shown with a flange 14 having an outer diameter greater than that of sidewall 11. The body of top member 13 is recessed and lies in a plane spaced from the plane in which flange 14 lies. Top member 13 is placed on an open end of sidewall 11 with the right angle formed by the spacing of the recessed portion and the flange 14 being positioned to provide a snug fit with the inner surface of sidewall 11 as shown in FIGURE 3. Flange 14 is then crimped by rolling it over the outer surface of sidewall 11 to pinch the latter in cooperation with the recessed portion of top member 13 as shown in FIGURE 4, thereby providing a gas-tight fit between the top member 13 and the sidewall 11. The end closure members 12 and 13 can be of any material substantially impervious to the passage of oxygen and water vapor. Preferably, the ends are fabricated from metals which also contribute additional rigidity to the package.

The top member 13 can optionally be provided with a pull-tab and have a score line thereon defining a tearable opening strip such as that shown in U.S. Patent 3,195,765, granted July 20, 1965, to J. Henchert. When this type of top member is used it is preferred that the material used be aluminum to facilitate the tearing thereof, although tinplate is also suitable.

The product which is packaged within the container comprises a plurality of thin, uniformly-shaped chip-type products 15 which are arranged in a stacked manner to form a grouped array as shown in FIGURE 1. While particularly suitable for the packaging of potato chips, the method and package of the present invention can also be used to package other chip-type snack food products such as corn chips, wheat chips and the like. Although only a single stack is shown, more than one stack of chips can be provided in a single container. In order to prevent excessive damage to the chips which may result from their striking the sidewalls of the package because of the application of various handling and shipping loads, a corrugated sleeve 16 can be inserted along the inner surface of the tubular body 11 with the corrugations positioned longitudinally thereof. A suitable sleeve which can be used for this purpose is a B-flute, single-faced, corrugated glassine structure.

While shown as having a circular cross section in FIGURE 2, the tubular body 11 can have an elliptical cross-section or can be of any other desired shape.

The chips can be conveniently dispensed from the package by pouring them from the opening which results by removing the top member 13. After being opened, the package can be reclosed by inserting a flexible cover lid 17 over the open edge of the container. Cover lid 17 can be injection molded of polyethylene, polypropylene, or the like and will assist in keeping the product fresh by tending to reduce the amount of additional oxygen or water vapor which enters the package after it has been initially opened.

It is an essential element of the present invention that the chips which are to be packaged be substantially uniform in both size and shape so that they can be stacked one upon the other to form a grouped array. Non-uniform chips cannot be effectively stacked and thus must be randomly distributed within the package, an approach which results in a larger package with wasted space and the tendency for additional oxygen and water vapor to be packaged with the chips. The uniformity of the chips of the present invention extends not only to the general shape and surface curvature, but also to the size of the chips. Arranging uniform chips in a stack which is a tubular array results in less breakage due to the close proximity of adjacent chips, which tends to react to external loads in a manner analogous to a laminated structure, which has a strength much greater than the individual laminae of which it is composed.

Figure 5:
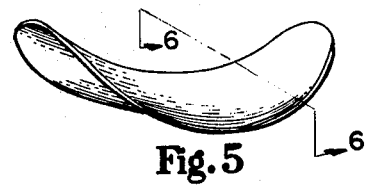
FIGURE 5 is a perspective view of one form of potato chips which may be packaged in a container of the present invention.
Figure 7:
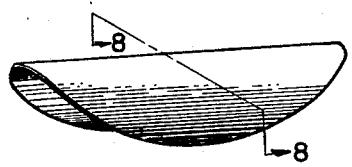
FIGURE 7 is a perspective view of another shape of potato chip.
Figure 6:
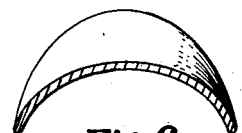
FIGURE 6 is a cross-sectional view taken along the line 6—6 of FIGURE 5.
Figure 8:
FIGURE 8 is a cross-sectional view taken along the line 8—8 of FIGURE 7.

Although it is possible to utilize uniform chips having a planar, disc-type shape, a stack of such chips has little transverse strength and resistance to side loads other than that which results from the friction between adjacent chips. It is thus preferred that the chips used in practicing the present invention be non-planar in shape, in addition to being uniform, to provide some degree of interfitting of adjacent chips and thereby improve the transverse strength of the resulting stack and its resistance to side loads. Just as the stacking of the chips one upon the other provides a laminated structure in the axial direction, by uniformly curving the chip surfaces, a laminated effect is provided in the transverse direction also. Although chips can be successfully packaged according to the present invention when they have upper and lower major surfaces formed from single curves as shown in FIGURES 7 and 8, chips having upper and lower major surfaces both of which are similarly curved in each of two orthogonal planes as shown in FIGURES 5 and 6 provide a stack having greater transverse rigidity. Chips having the parabolic cross section shown in FIGURES 7 and 8 result in a stack having transverse rigidity in all directions except the direction perpendicular to the cross section of FIGURE 8. In this direction the stack behaves in a manner similar to a stack of flat, planar discs. However, in all other directions the lamination effect of adjacent chips substantially increases transverse rigidity. Chips having the saddle shape shown in FIGURES 5 and 6 have a compound surface curvature which provides the lamination effect in all transverse directions and does not permit slippage between adjacent chips in any transverse direction. The radius of chip surface curvature in each of two orthogonal planes passing through the centroid of the chips, to prevent slippage and achieve transverse rigidity, is preferably not greater than about 10 inches, and most preferably not greater than about 5 inches; the radius of curvature is preferably not less than about ½ inch. While many shape variations within this framework are possible, it is desirable to use the general shape in which potato chips are presently marketed, that is, the saddle shape, since that is a form with which consumers are familiar and which meets with their acceptance.

The present packaging approach can be used with chips made from thin slices of raw potato, or it can be used with chips which are made from a formulated, potato-based dough which is rolled into sheets having a thickness of from about 0.009 inch to about 0.03 inch and from which substantially equally-shaped sections are cut and fried. The chips so prepared can have a thickness after frying of from about 0.03 inch to about 0.05 inch. Chips prepared from a flexible sheet of dough are best suited to the shaping which the present packaging technique requires. One type of apparatus which can be used to prepare uniformly sized and shaped chips to be packaged in accordance with the present invention is shown in the co-pending application of Alexander L. Liepa, entitled "Method of and Apparatus for Preparing Chip-Type Products," Ser. No. 683,083, filed Oct. 31, 1967, said application being assigned to the same assignee as the present invention.

As a result of packaging uniformly sized and shaped chips according to the present invention, the quantity of air space or space not occupied by the chips is reduced considerably in comparison with that found in packages wherein the chips are randomly distributed. Since there is less air space within the package, there is less oxygen and water vapor which is packaged with the chips and thus the effective shelf life of the chips so packaged is extended by reason of the reduced tendency toward oxidative deterioration and staling. Oxidative rancidity of the frying fat ordinarily takes place after the passage of some time and the time in which such a condition can occur is directly related to the quantity of oxygen present.

In addition to increased shelf life and reduced chip breakage, closely spacing potato chips according to the present invention also results in the elimination of settling of the chips within the package, during shipping and handling and thus the packages do not appear under-filled after being so handled as is usually the case with the conventional potato chip packages and packaging methods.

In order to further extend the shelf life of the potato chips so packaged, the container 10 can have an inert gas atmosphere provided therein in a manner well known to those skilled in the art. The inert gas replaces the oxygen which would ordinarily be present and thereby prevents the onset of oxidative rancidity of the frying fats. Although nitrogen is the gas most generally used when an inert gas atmosphere is to be provided within a package, other gases such as carbon dioxide, argon, neon, and the like are also suitable.

While particular embodiments of the invention have been illustrated and described, it will be obvious to those skilled in the art that various changes and modifications can be made without departing from the spirit and scope of the invention and it is intended to cover in the appended claims all such changes and modifications that are within the scope of this invention.

What is claimed is:

1. A method of packaging uniformly shaped chip-type snack food products to provide a compact package with a minimum of void space therewithin to minimize both staling of the chips and the formation of oxidative rancidity of the frying fat retained by the chips, said method comprising:
  (a) arranging a plurality of chips of substantially uniform size and substantially uniform, non-planar shape in abutting relationship with corresponding surfaces similarly oriented to form a stacked array having a greater unit strength in each direction than that of the individual chips, whereby to reduce the incidence of breakage of individual chips caused by handling loads imposed thereon;
  (b) positioning said stacked array within a rigid, tubular structure having at least one open end, said tubular structure being substantially impervious to the passage of oxygen and water vapor;
  (c) introducing an inert gas into said tubular structure to displace the oxygen therefrom and thereby further extend the useful storage life of the chips packaged therein by preventing the formation of oxidative rancidity of the frying fat which is retained by the chips, said inert gas selected from the group consisting of nitrogen, carbon dioxide, argon, and neon; and
  (d) closing said tubular structure by securing a closure member to each open end thereof, said member being substantially impervious to the passage of oxygen and water vapor to form a gas-tight seal, whereby to provide an oxygen-impervious package to maintain the chips therein packaged in substantially fresh condition and extend the useful shelf life thereof.

2. A package of uniformly shaped, non-planar chip-type snack food products, said package having a minimum of void space therein to minimize both staling of the chips and the formation of oxidative rancidity caused by the interaction of oxygen with the frying fat retained by the chips, said package comprising:
  (a) a plurality of chips of substantially uniform size, shape, and thickness and having the major surfaces thereof defined by compound curves, said chips being positioned in abutting relationship with corresponding surfaces similarly oriented to form a substantially compact, stacked array, whereby the breakage of the chips from the application of handling and shipping loads is reduced over that which would exist if the chips were randomly arranged; and
  (b) a substantially rigid tubular package surrounding said stacked array of chips, said package having a side wall formed from a substantially oxygen-impervious material and having ends secured thereto, said ends being substantially impervious to the passage of oxygen and water vapor to provide a substantially gas-tight package and prevent the passage of oxygen and water vapor therethrough.

3. The package of claim 2 wherein said side wall is formed from a lamination comprising polyolefins, metallic foil, and kraft paper.

4. The package of claim 2 wherein the chips therein packaged have upper and lower surfaces which are oppositely curved in each of two orthogonal planes to form surfaces composed of compound curves to provide an interlocking effect to the stacked array of chips to prevent relative rotation between abutting chips, and thereby reduce the incidence of breakage of individual chips during the shipping and handling of the packages.

5. The package of claim 4 wherein said chips are surrounded by an inert gas selected from the group consisting of nitrogen, carbon dioxide, argon, and neon to extend the useful storage life of the chips therein packaged.

6. The package of claim 5 wherein said package includes an inner protective sleeve surrounding said stacked array to cushion the same and prevent direct contact between said array and said package sidewall and thereby minimize breakage of said chips.

References Cited

UNITED STATES PATENTS

| 1,326,520 | 12/1919 | McLaren | 206—65 |
|---|---|---|---|
| 2,142,567 | 1/1939 | Levy | 206—65 |
| 2,569,217 | 9/1951 | Bagdigian | 99—171 |
| 2,769,714 | 11/1956 | Stahmer | 99—100 |
| 3,106,327 | 10/1963 | Karl | 229—4.5 |
| 3,116,869 | 1/1964 | Kauffeld | 229—3.5 |

A. LOUIS MONACELL, Primary Examiner

S. B. DAVIS, Assistant Examiner

U.S. Cl. X.R.

99—100, 189; 206—46, 65; 229—4.5